United States Patent [19]

Volejnik

[11] Patent Number: 5,459,782
[45] Date of Patent: Oct. 17, 1995

[54] METHOD AND ARRANGEMENT FOR TRANSMITTING DIGITAL SIGNALS

[75] Inventor: Wilhelm Volejnik, Sauerlach, Germany

[73] Assignee: Siemens Aktiengesellschaft, Munich, Germany

[21] Appl. No.: 94,051

[22] PCT Filed: Jan. 16, 1992

[86] PCT No.: PCT/DE92/00023

§ 371 Date: Jul. 19, 1993

§ 102(e) Date: Jul. 19, 1993

[87] PCT Pub. No.: WO92/13405

PCT Pub. Date: Aug. 6, 1992

[30] Foreign Application Priority Data

Jan. 17, 1991 [DE] Germany ............ 41 01 270.4

[51] Int. Cl.$^6$ ........................ H04L 7/00
[52] U.S. Cl. ........................ 375/372; 370/102
[58] Field of Search ................ 375/112, 118, 375/120, 121, 371, 376, 372, 377; 370/102, 84

[56] References Cited

U.S. PATENT DOCUMENTS

| | | | |
|---|---|---|---|
| 4,667,324 | 5/1987 | Graves | 375/112 |
| 4,764,941 | 8/1988 | Choi | 375/112 |
| 4,791,652 | 12/1988 | McEachern et al. | 375/112 |
| 5,132,970 | 7/1992 | Urbansky | 375/112 |

FOREIGN PATENT DOCUMENTS

| | | |
|---|---|---|
| 0197492 | 10/1986 | European Pat. Off. . |
| 0248551 | 12/1987 | European Pat. Off. . |
| 4101270 | 7/1992 | Germany . |

OTHER PUBLICATIONS

"STC-TM3 Experts meeting on SDH network aspects", European Telecommunications Standards Institute, Sep. 18–20, 1990.

"Waiting Time Jitter Reduction by Synchronizer Stuff Threshold Modulation", IEEE 1987, pp. 514–518.

Primary Examiner—Stephen Chin
Assistant Examiner—Tesfaldet Bocure
Attorney, Agent, or Firm—Hill, Steadman & Simpson

[57] ABSTRACT

During the transmission of digital signals which are interlaced in a multiplex signal, plesiochronic clock frequencies are also matched by means of positive-zero-negative stuffing. In this case, the time intervals of the phase changes can be large in comparison with the time constant of a phase low-pass filter which is formed by a phase-locked loop at the receiving end, which results in a jitter of approximately 1 UI. This jitter can be reduced if additional stuffing processes are inserted in pairs, in such a manner that an additional positive stuffing process (PST) is followed by such a negative stuffing process (NST) or, overall, vice versa, and if the time intervals within the pairs and/or between the pairs are selected in such a manner that the mean value of the phase difference between an incoming digital signal at the transmission end and an outgoing digital signal at the transmission end, which is contained in the multiplex signal, averaged over a specific time duration, remains approximately constant.

4 Claims, 6 Drawing Sheets

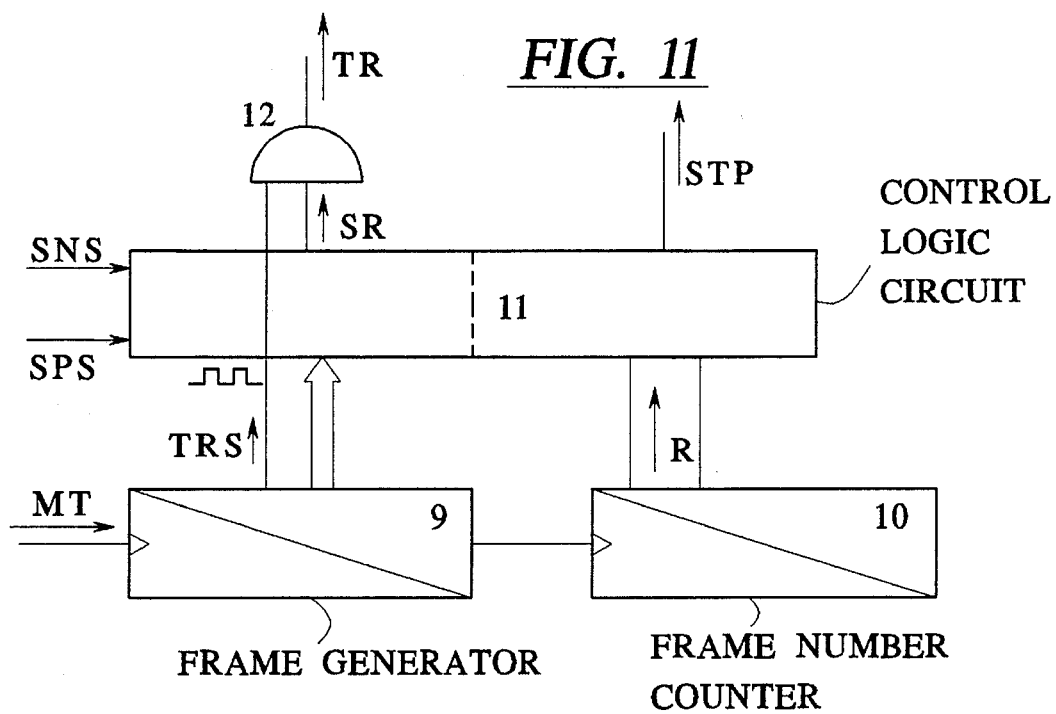

METHOD AND ARRANGEMENT FOR TRANSMITTING DIGITAL SIGNALS

BACKGROUND OF THE INVENTION

1. Field of the Invention

The present invention relates generally to a method and apparatus for transmitting at least one incoming digital signal in a data channel having a constant clock rate, in the case of which the data rates are matched by positive-zero-negative stuffing in that, on reaching an upper decision threshold and a lower decision threshold of the phase separation, additional stuffing processes are produced, beyond the required stuffing processes.

2. Description of the Related Art

The positive, the negative and the positive-zero-negative stuffing techniques are described in Section 1.4, pages 8 to 12 and 15 to 20, May 1983 issue and pages 13 to 14, May 1984 issue, of the loose-leaf document "Digitale Übertragungstechnik" [Digital transmission technology], Kahl, R. v. Becker's Press, G. Schenck, Heidelberg.

In order to be able to transmit transmitted data signals in a data channel having a constant bit rate, the transmission bit rate must be matched to the bit rate of the digital signal. For this purpose, the transmitted data signal contains stuffing points at periodic intervals, which stuffing points contain bits of the digital signal or dummy bits, as required.

If the stuffing point is planned to contain data bits of the digital signal and dummy bits to the extent by which the bit rate of the digital signal lags behind that of the transmission bit rate reserved, the insertion of the dummy bits into the stuffing points is designated positive stuffing.

If the stuffing point is planned to contain dummy bits and data bits of the digital signal to the extent by which the bit rate of the digital signal exceeds that of the transmission bit rate reserved, the insertion of the data bits into the stuffing points is designated negative stuffing.

Stuffing methods which use both types of stuffing are designated positive-zero-negative stuffing methods.

These methods are used even when multiplex signals on a lower hierarchical level are to be combined to form a common multiplex signal on a higher hierarchical level.

Each stuffing process having a bit produces a phase change of the outgoing (transmitted) digital signal by one UI (unit interval). Positive stuffing causes the phase to lag by one UI with respect to the incoming digital signal; negative stuffing causes a phase lead of one UI. The phase changes are smoothed by means of a phase-locked loop PLL at the destination (for example during recovery of the transmitted signal from the multiplex signal). On the basis of its dimensioning, the phase-locked loop acts like a low-pass filter having a cutoff frequency $f_0$. The time constant of the low-pass filter is $T=1/(2*\pi*f_0)$. The amplitude of the phase changes (jitter) caused by stuffing is greatly reduced by the phase-locked loop if the time interval between the phase changes is very small in comparison with the time constant T, that is to say if the frequency with which the stuffing processes occur is very high in comparison with the cutoff frequency $f_0$.

In the case of the positive-zero-negative stuffing method, the time intervals between the phase changes can be large in comparison with the time constant T. In this case, the amplitudes of the phase changes are not damped much by the phase-locked loop and the values of the jitter are virtually one UI.

From the publication "Jitter Analysis of Asynchronous Payload Mappings", T1X1.4/86-447, Contribution to T1 Standards Project-T1X1.4, 12.11.86, pages 9 and 10, "threshold modulation" is furthermore known, in the case of which thresholds of the phase difference between an incoming digital signal at the transmission end and an outgoing digital signal at the transmission end are varied, so that additional stuffing processes are produced. In this case, the jitter assumes a higher frequency which can be filtered more easily.

The European Patent Specification 0 248 551 A2 describes a method for synchronization of asynchronous data (stuffing method) which leads to an increase in the stuffing frequency and hence in the jitter frequency. The use of stepped characteristics for the threshold values for initiating the additional stuffing processes is also known from this document. In the case of this method, the superfluous stuffing processes are disadvantageous when the (synchronous) signal which is to be transmitted has the desired phase. The arrangement is likewise dependent on considerable circuit complexity.

The European Patent Application 0,192,492 likewise describes a method for increasing the stuffing frequency in the case of a positive-zero-negative stuffing method.

SUMMARY OF THE INVENTION

The invention is based on the problem of further reducing the jitter values in the case of the positive-zero-negative stuffing, and provides for transmitting at least one incoming digital signal in a data channel having a constant clock rate, whereby the data rates are matched by positive-zero-negative stuffing in that, on reaching an upper decision threshold and a lower decision threshold of the phase separation, additional stuffing processes are produced, beyond the required stuffing processes. The invention is particularly characterized by stuffing processes being additionally carried out in pairs such that an additional positive stuffing process is followed by a negative stuffing process, or vice versa, the time intervals in each case between a positive stuffing process and a negative stuffing process being varied with respect to the intervals in each case between the negative and the subsequent positive stuffing process, as a function of the phase separation, in such a manner that the mean value of the phase separation of the outgoing digital signal from the incoming digital, formed between successive stuffing processes of the same direction, is approximately constant, the mean value of the phase separation between the outgoing digital signal and the incoming digital signal corresponding approximately to the rated value of the phase separation of zero, as a result of the additional stuffing processes, a stuffing superframe, which is defined between two stuffing processes in the same direction, having a constant number of pulse frames and the position of the intervening stuffing process in the other direction is varied in accordance with the phase separation, an upper decision threshold, for initiating the one stuffing process and having a step-shaped course being reduced step-shaped in a stuffing superframe from a maximum value which is less than or equal to one unit interval to a minimum value of ≧ zero, and is then set to the maximum value again at the beginning of the next stuffing superframe, a lower decision threshold for triggering the other stuffing process proceeding in the same direction at the spacing of one unit interval, and the maximum value of the lower decision threshold being less than the minimum value of the upper decision threshold, and the stuffing superframe and the decision thresholds, which run in a stepped manner, being selected in such a manner that, during one period duration of the stuffing superframe, the phase of the outgoing digital signal changes with respect to the incoming digital signal by less than the difference between two adjacent decision threshold values.

An advantageous arrangement for carrying out the method includes means for transmitting at least one incoming digital signal via a data channel having a constant clock rate, whereby the data rates are matched by positive-zero-negative stuffing in that, on reaching a predetermined upper or lower phase separation, additional stuffing processes are produced, beyond the required stuffing processes, having a memory into which the incoming digital signal is written using a write clock and from which reading out takes place using a read clock, having a system controller for controlling the outgoing digital signal and the stuffing processes, and having a threshold value decision device which initiates a stuffing process in the event of an upper stepped decision threshold being exceeded or a lower decision threshold being undershot, the threshold value decision device having an upper decision threshold for the phase separation of less than one unit interval and $\geq 0$, which runs in a stepped manner and changes with each of N pulse frames of a stuffing superframe, and has a lower decision threshold, which proceeds uniformly therewith, in that phase deviations of less than one unit interval are determined which initiate a stuffing process when a decision threshold is upwardly or downwardly transgressed, in that the system controller has a frame generator which forms the pulse frame and controls a frame number counter, in that a control logic circuit is provided as the threshold decision device, to which control logic circuit time criteria are passed from the frame generator and from the frame number counter, and in that the control logic circuit produces a control signal which corresponds to a pulse, which is allocated to each and every pulse frame of a stuffing superframe, at different testing times, which pulse stores a difference value which indicates the occupancy level of the memory.

The advantage which is achieved using the invention is that the mean value of the phase of the transmitted digital signal fluctuates less, as a result of which the jitter is considerably reduced.

The arrangement as disclosed herein can be implemented with little additional complexity.

Refinements of the method further include difference values which indicate the occupancy level of a stuffing memory being evaluated as decision thresholds for initiating additional stuffing processes in pairs, and the difference values being evaluated at different testing times, of which in each case one is allocated to one of the pulse frames of a stuffing superframe. Preferably, at the transmission end, a plurality of outgoing digital signals is combined to form a multiplex signal, and, at the receiving end, the multiplex signal is split into the individual signals which are read out using a read clock at the receiving end, which is obtained in a phase-locked loop.

BRIEF DESCRIPTION OF THE DRAWINGS

Exemplary embodiments of the invention are described in more detail in the following text, with reference to figures, in which:

FIG. 11 shows the principle of a system controller and

FIG. 12 shows a receiving section.

DETAILED DESCRIPTION OF THE PREFERRED EMBODIMENTS

Figure 1:
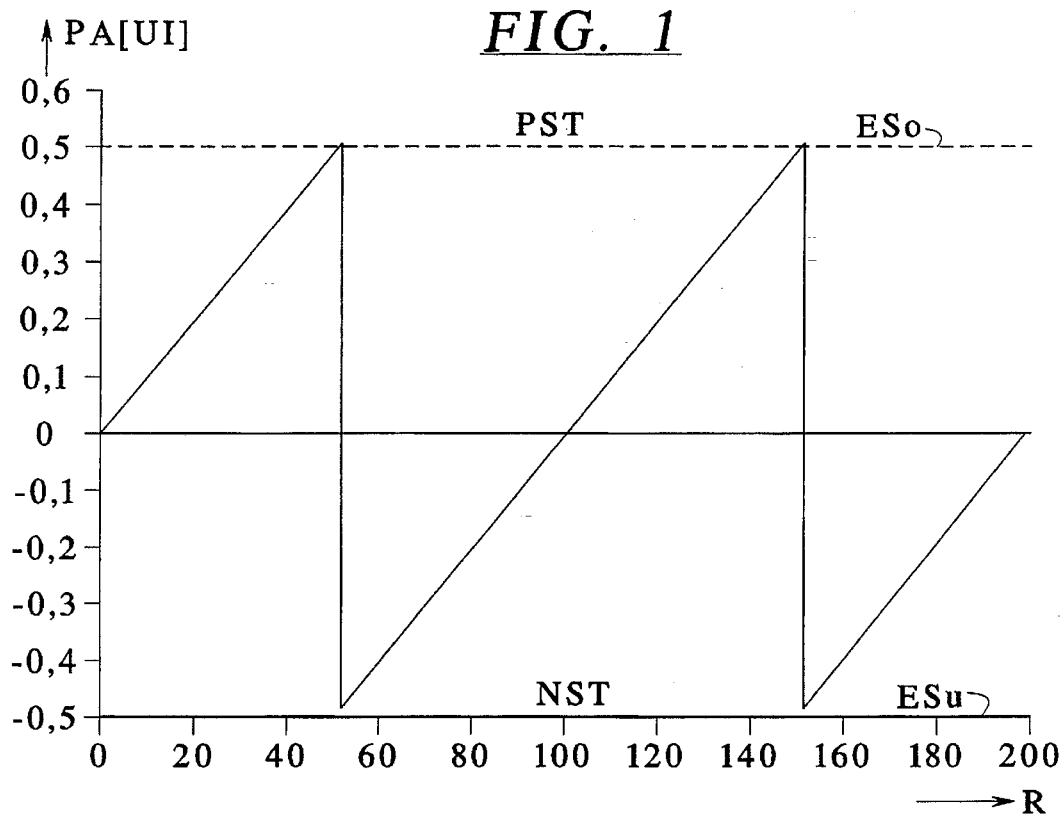
FIG. 1 shows a known response of the phase deviation of a digital signal to be transmitted, with respect to the desired value of the phase, over a large number of frames, in the case of the known positive-zero-negative stuffing.

FIG. 1 shows the response of the phase deviation PA in UI (unit intervals) of the outgoing (transmitted) digital signal DSa at the transmission end—more precisely its "desired value" of the phase—with respect to the incoming digital signal DSe at the transmission end, and the matching of the outgoing digital signal DSa to the data rate of the incoming signal, using stuffing processes. From the arrangement shown in FIG. 6, it can be seen that the incoming digital signal DSe is initially written into a memory 2. It is read out of this memory as the outgoing digital signal DSa and is transmitted (as a rule) at a slightly deviating data rate (corresponding to the nominal transmission capacity of the data channel).

The deviations from the data rate of the incoming digital signal are compensated for by stuffing. At this stage, it is not intended here to go into the fact that the outgoing digital signal DSa is called up by a gapped clock. This is intended to take into account the term "desired value of the phase". As an example of this: if the data rates of the digital signal which is transmitted (outgoing) without stuffing and of the incoming digital signal are identical, then there is no phase difference between the digital signals in the representation in FIG. 1. A circuit-dependent constant phase difference is not taken into account. A constant upper decision threshold ESo at +0.5 UI and a lower decision threshold ESu at— 0.5 UI are defined.

In the example, the stuffing rate is assumed to be 0.01, that is to say the phase deviation PA has changed by 1 UI after every hundred pulse frames, so that a stuffing process takes place.

In consequence, in this example—if the data rate of the transmitted digital signal is greater than that of the incoming signal—the phase deviation PA likewise increases by 0.01 UI per pulse frame. After exceeding the upper decision threshold ESo at +0.5 UI, positive stuffing (PST) is carried out, as a result of which the phase deviation PA changes by 1 UI to a value of approximately—0.5 UI. Subsequently, it increases uniformly again by 0.01 UI per pulse frame R. The decision threshold +0.5 UI is reached again after 100 pulse frames R and a further stuffing process PST is initiated. This results in a slow jitter (phase fluctuations) which can be damped only inadequately by a phase low-pass filter at the receiving end, which filter is formed by the phase-locked loop (PLL) of a desynchronizer.

In the case of the known solution, the phase-locked loop has—as a function of the deviation between the data rate and transmission rate—to process a full phase change of one UI at large intervals.

Figure 4:
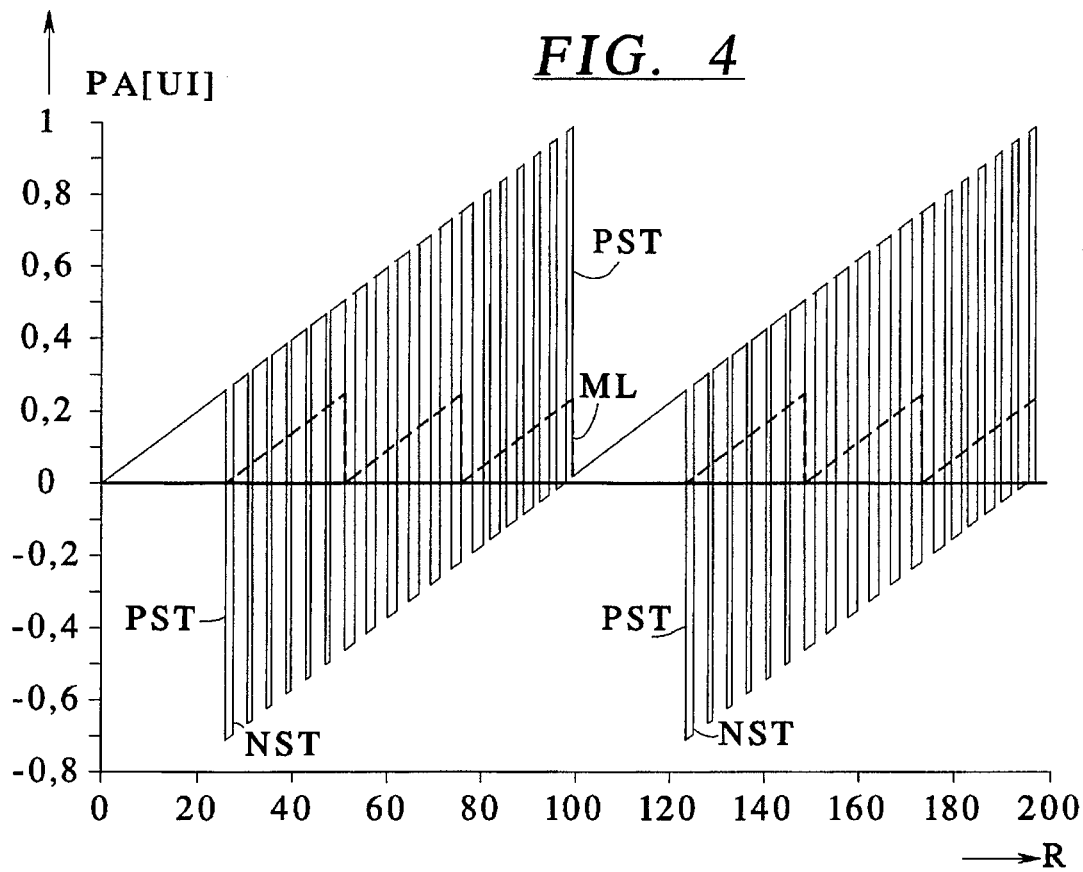
FIG. 4 shows a response of the phase deviation of the transmitted digital signal, with respect to the desired value of the phase, over the number of frames in FIG. 1, using the method in FIG. 2.

In the case of the invention, phase changes are produced more frequently, as is shown in FIG. 4, and the low-pass effect of the phase-locked loop at the receiving end is utilized. Negative and positive phase changes are transmitted alternately, that is to say positive and negative stuffing are carried out alternately. These pairs of stuffing processes PST and NST which, however, at the transmission end produce no resultant phase correction whatsoever between the incoming digital signal and outgoing digital signal, are continued until a specific phase deviation is exceeded, which leads to a "real" individual stuffing process. The interval between the "real" stuffing processes is, as before, dependent on the difference between the bit rate of the incoming digital signal and the transmission bit rate of the data channel which is used.

In spectral terms, the method has the effect that, at the receiving end, the spectrum of the control voltage produced by the stuffing processes has higher frequencies which are filtered out by the phase-locked loop, so that jitter is largely prevented.

The principles for initiating the additional stuffing processes in pairs are intended to be explained with reference to FIG. 2. This figure once again shows a response of the phase deviation PA of an outgoing (transmitted) digital signal DSa, shown normalized with respect to the incoming digital signal DSe over the stuffing decision times STE of successive pulse frames R. The decision characteristics for an upper decision threshold ESo and for a lower decision threshold ESu are shown by thick lines, the two decision threshold values ESo1, ESo2, ..., and ESu1, ESu2, ..., respectively of which decision thresholds change in a stepped manner in steps of 0.2 UI in the same direction, the interval between two decision thresholds ESo and ESu which are associated in time always being 1 UI. A stuffing superframe SUR in this case comprises N=5 pulse frames to which in each case five different upper and lower decision threshold values are allocated. If, at the time of a stuffing decision STE, a phase difference PA is above the upper decision threshold ESo (or at least reaches said threshold), it is positively stuffed; this is designated by PST once again.

If, on the other hand, the phase difference PA is below the lower decision threshold ESu, it is negatively stuffed, designated by NST. The phase difference PA changes by 1 UI as a consequence of each stuffing process.

The continuous thin line shows an optimum phase difference PA of 0, in the case of which no stuffing is required. This is the desired phase. The dashed-dotted line and the dashed line in contrast show two phases, in the case of which stuffing is carried out in pairs in each case. The mean value—averaged over the period duration of the stepped decision characteristic, that is to say of a stuffing superframe—is, however, always approximately zero.

Figure 2:
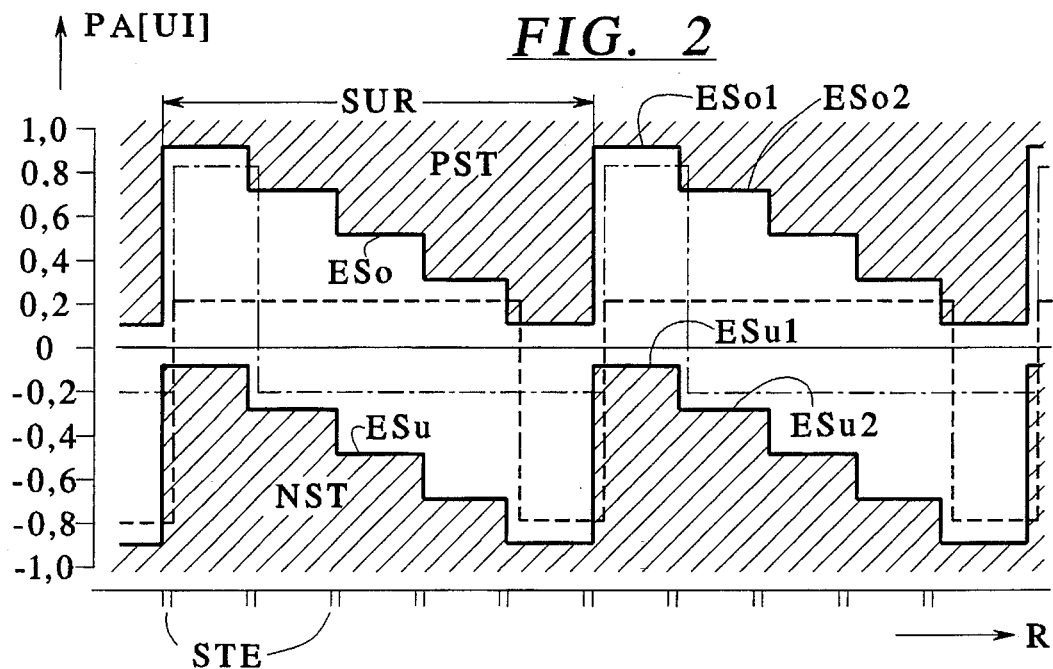
FIG. 2 shows a response of the phase deviation of a digital signal to be transmitted, normalized with respect to the desired value of the phase, over a number of the stuffing decision times, in the case of the method according to the invention.

FIG. 2 shows that the duration between the successive stuffing processes NST and PST (or PST and NST) depends on the phase deviation. If PA=0 or if none of the decision thresholds is exceeded, then no stuffing processes take place.

If PA is positive and large (dashed-dotted line), then negative stuffing and positive stuffing follow in successive pulse frames R.

If PA is negative and large (dashed lines), the interval between negative stuffing and positive stuffing is, in contrast, large.

Mean phase deviations PA result in mean intervals. The dashed line and the dashed-dotted line run exactly horizontally only when no time-dependent phase changes (for example in accordance with FIG. 1) take place. The mean value of the phase deviation is always approximately zero.

Figure 3:
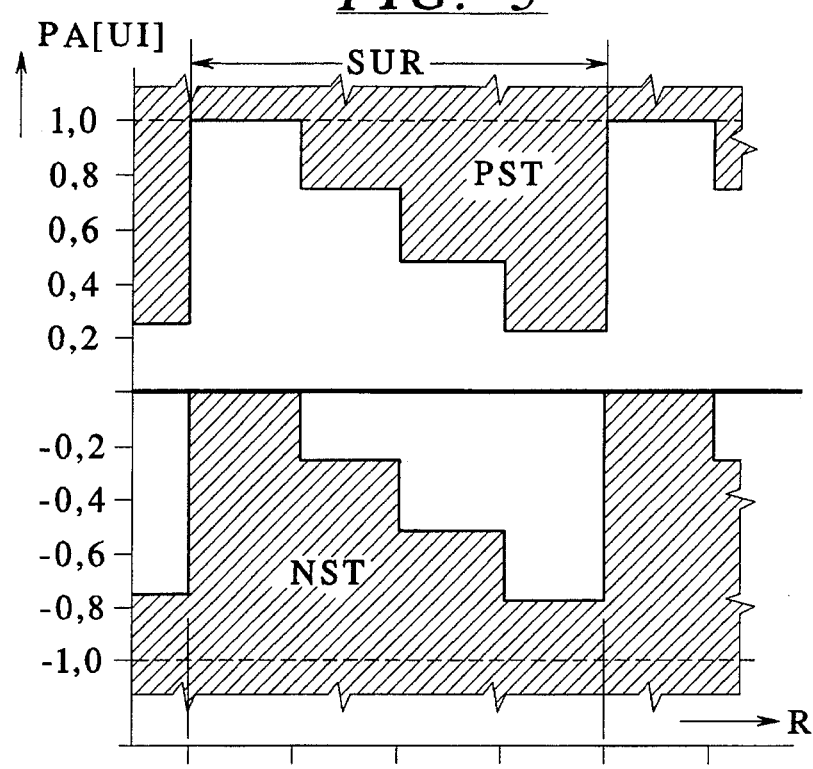
FIG. 3 shows a response of the phase deviation using other decision thresholds.

FIG. 3 shows a variant of the decision characteristics, which form the basis of the phase response shown in FIG. 4. The separations of the decision characteristics from the zero line are not equal. The maximum decision threshold ESo is identical to the threshold for the positive stuffing processes, which are not in pairs, so that, in the event of positive phase deviations, only three additional decision thresholds initiate stuffing processes in pairs. In the case of a stuffing rate of 0.01, which is unchanged from FIG. 1, the upper decision threshold ESo is varied in such a manner that the decision threshold values assume the values 1 UI, 0.75 UI, 0.5 UI, and 0.25 UI in N=4 successive frames R, at which point the decision threshold changes to 1 UI again. The lower decision threshold ESu runs parallel thereto with values which are lower by 1 UI. This is repeated after the stuffing superframe period SUR, which covers four frames R.

FIG. 4 shows a response of the phase deviation of the outgoing digital signal DSa (desired values of the phase) with respect to the incoming digital signal DSe. In the example of the superimposition in FIG. 1, the representation here corresponds to the additional stuffing processes which are initiated in accordance with FIG. 3.

The above numbers were selected so that the effect according to the invention can be identified as clearly as possible. After 25 frames R, when the phase difference reaches 0.25 UI, positive stuffing and subsequent negative stuffing in pairs are instituted in such a manner that the mean value of the phase deviation PA after one stuffing superframe is zero. It then rises in accordance with the actual phase deviation. In FIG. 4, the mean value line ML was shown by dashed lines. A mean value line which is symmetrical with respect to the zero line can also be achieved by a modified arrangement of the decision thresholds. This does not result in a further reduction of the jitter.

The interval between positive stuffing PST and negative stuffing NST, which is initially only one frame R, is increased with an increasing phase difference in the case of a greater number of frames R. The mean value line is once again correspondingly shifted with respect to the zero line after 50 and 75 frames, with a change in the intervals between the stuffing processes. At approximately the hundredth frame, when the phase deviation PA briefly reaches approximately 1 UI, the associated negative NST after a positive stuffing process PST is omitted, and the phase difference falls to zero.

At approximately the 125th pulse frame, a further positive stuffing process PST once again takes place, which is followed immediately by a negative stuffing process NST again, and the described process is repeated.

The lowest decision threshold value, up to which point no stuffing processes take place, can be selected to be as small as desired.

It is also clear from FIG. 4 that a staircase curve having a plurality of steps (a sawtooth in the ideal case) leads to smaller deviations from the desired value PA=0 of the phase difference. In consequence, the frequency with which the stuffing processes occur is, of course, reduced corresponding to the increase in the decision thresholds.

It is intended to explain the method of operation of the invention in more detail before going into details of the arrangement.

An outline circuit diagram of the receiving section is shown in FIG. 12. It contains a memory 13 and a phase-locked loop 14 having a voltage-controlled oscillator (VCO), a phase-comparison circuit 16 and a low-pass filter 17. The read clock TRE and write clock TWE at the receiving end are each passed via a frequency divider 18 or 19 respectively, to the phase-comparison circuit 16.

The data bits, which arrive irregularly as a result of stuffing processes, of the digital signal are converted by the phase-locked loop into a digital signal DSe which has a data rate that is as constant as possible and corresponds as far as possible to the incoming digital signal DSe at the transmission end. In the case of multiplex systems, the received multiplex signal MS is initially split, by means of a demultiplexer 20, into a plurality of digital signals.

At the receiving end, the phase difference of the transmitted digital signal from the digital signal DSe and a read clock TRE at the receiving end largely corresponds to the response shown in FIG. 4. When considered with respect to time, the transmission of the stuffing processes has the following meaning for the phase-locked loop at the receiving end: The stuffing processes on each occasion cause the reception of one information bit less or one information bit more, and hence one clock pulse of the associated write clock TWE more or less and hence, at the output of a frequency divider which is connected upstream of the phase-locked loop, on each occasion a positive or a negative phase change in the reference variable, that is to say the control voltage (control deviation) for the oscillator of the phase-locked loop. The additional positive stuffing processes and the negative stuffing processes occur during one sawtooth period (FIG. 4) in the initial, central and final region for different time and, as a result of the low-pass filtering effect, cause the mean oscillator frequency to have smaller phase fluctuations. In other words: the phase-locked loop is controlled even before the "real" stuffing process takes place.

The method of operation of the method can also be explained in such a manner that, at the receiving end, as a result of the stuffing processes which are frequently carried out, the resulting large phase difference are eliminated by the low pass filtering effect of the phase-locked loop and, as a result of the different stuffing intervals, the mean phase deviation (pulse-width modulation) fluctuates less. The time constant T of the phase-locked loop should be greater than the duration of one stuffing superframe.

Figure 5:
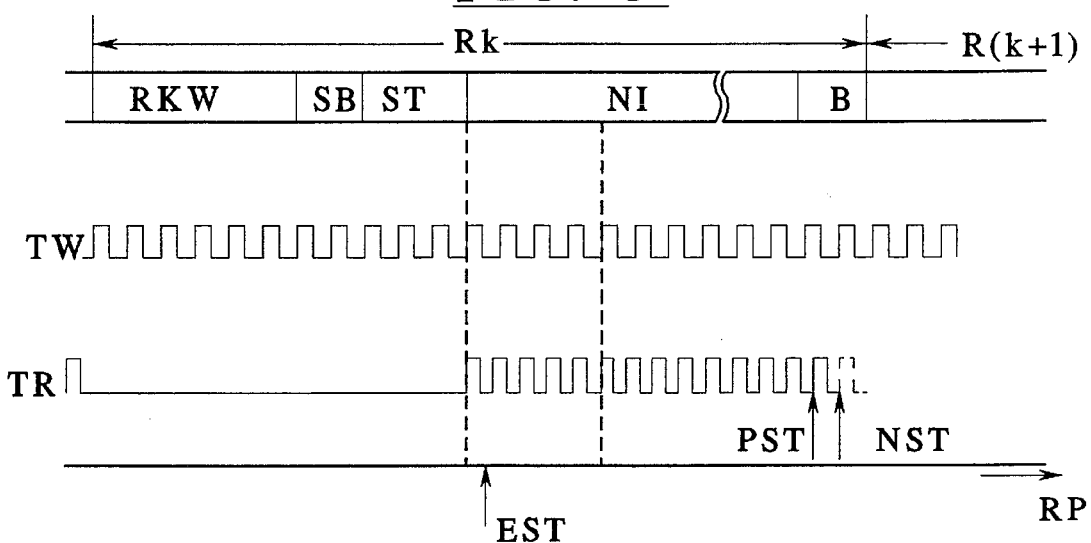
FIG. 5 shows a pulse frame.

FIG. 5 shows a simplified pulse frame Rk. The latter contains a frame tag RKW, service bits SB, useful information NI, stuffing information ST and two time slots B for the transmission of stuffing bits or information bits. The stuffing information ST indicates whether stuffing bits or information bits are intended to be transmitted in the time slots B. These bit positions are designated by PST and NST. The frame position RP indicates the time slots for in each case one bit in the pulse frame. The decision time EST in this case occurs at the start of transmission of the useful information. It is, of course, also possible to stuffing using a plurality of bits. In addition, FIG. 5 shows a write clock TW and a read clock TR, which will be described later.

In multiplex systems, a plurality of digital signals are combined to form a multiplex signal which is transmitted inserted in a pulse frame/pulse superframe. The structures specified in accordance with G.709 in the CCITT Recommendations, for example, are also used as the pulse frame and pulse superframe. Likewise, digital signals can also be inserted into pulse frames which are used purely internally, for example in switching systems or cross-connectors.

Figure 6:
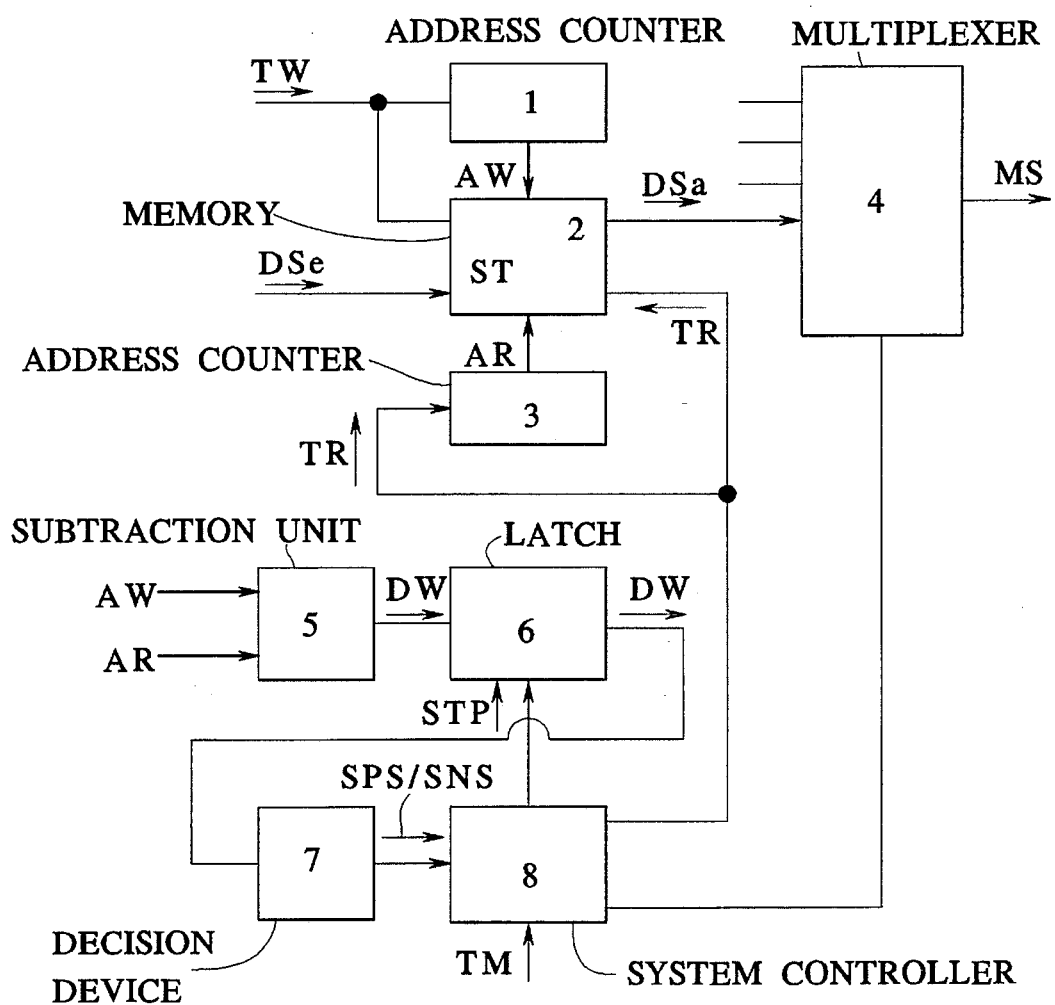
FIG. 6 shows an arrangement for carrying out the method.

FIG. 6 shows a multiplexing arrangement at the transmission end. Said arrangement consists of a memory 2 whose addresses are determined by two address counters 1 and 3. The digital signal DSe is written into the memory 2. The memory output is connected to a multiplexing device 4. The counter outputs supply the write address AW and the read address AR. Both are supplied to a subtraction circuit 5 which, at its output, emits a difference value DW which is stuffing-stored in a latch 6. Its output is connected to a threshold value decision device 7 which, in the event of the decision threshold values being exceeded or undershot, supplies signals SPS and SNS, for positive stuffing and negative stuffing respectively, to a system controller 8 (frame control).

The system controller operates using the multiplexing clock TM. Its object is to combine a plurality of digital signals DS to give a multiplex signal MS, to merge in additional information items such as frame tag words, service bits etc. and to control the stuffing processes. In terms of circuitry, these devices are known to any person skilled in the art of multiplexing technology. The digital signal DSe is written into the memory 2 using a common write clock TW. Reading-out takes place using a somewhat faster gapped clock, the read clock TR, which, however, has the same number of pulses per pulse frame. The occupancy level of the memory 2 controls the stuffing processes. The difference between the write address AW and the read address AR is formed for this purpose. If the difference value DW exceeds an upper threshold value, the difference value DWo, then negative stuffing takes place, in that a further data bit is read out of the memory 2 and is inserted in the region B of the pulse frame. If the difference value is less than the lower difference value DWu, then positive stuffing takes place.

Up to this point, this arrangement corresponds to the method of operation of the known arrangement. It should be noted as a precaution that the upper difference value DWo corresponds to the lower decision threshold ESu in FIGS. 1 to 4, and the lower difference value DWu corresponds to the decision threshold ESo.

One decision time EST is initially defined in a known manner in each pulse frame in order to determine the difference value. The difference value DW is evaluated at the decision time EST (FIG. 5). A reading pulse can now be extracted towards the end of the pulse sequence of the read clock TR in the case of a positive stuffing process, or, in the case of a negative stuffing process NST, a further information bit can be called up from the memory 2, by means of an additional read pulse. The method can also be used by changing the mean transmission rate of a bit which is inserted, for example, into each second pulse frame, without phase deviations (desired stuffing rate 0.5).

Figure 7:
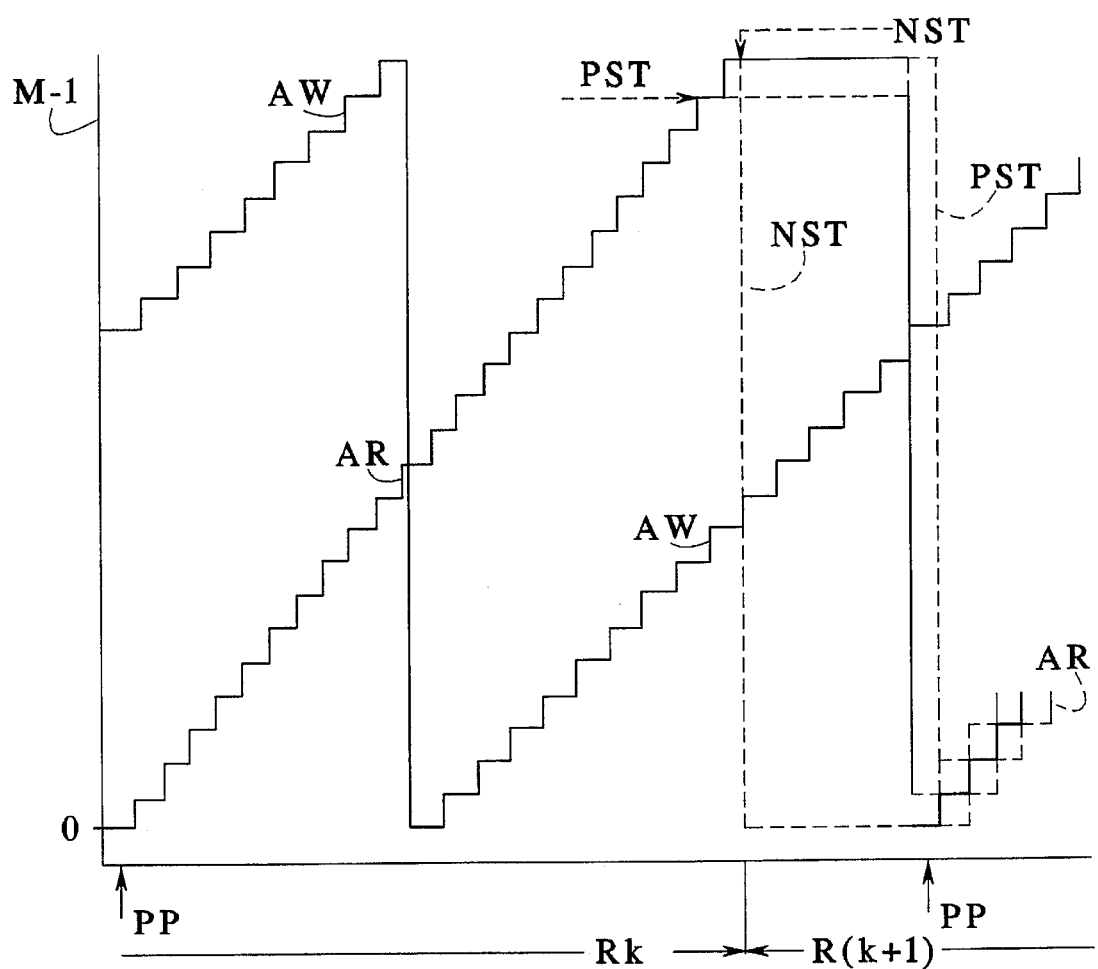
FIG. 7 shows a timing diagram for address control.

FIG. 7 shows a timing diagram to illustrate the operation for controlling the stuffing process. The addressing of the memory 2 via the address counters 1 and 3 in each case takes place by means of a modulus-M addition, corresponding to the number M of information bits in a pulse frame. The changes in the write address AW and the read address AR are shown in FIG. 7. Using the write clock TW and the read clock TR respectively, the write address AW and the read address AR are in each case increased by the value "1" in order to drop back to 0 when the counter state is M-1. During the transmission of the additional information, no useful information is called up from the memory 2, that is to say the read address AR remains constant. If the clock frequencies of the incoming digital signal DSe and of the outgoing digital signal DSa correspond, in terms of their desired clock frequencies, and the data rates of the outgoing digital signal (without stuffing) and of the incoming digital signal correspond then the timing diagram shown in FIG. 7 is repeated periodically with the following pulse frame R (k+1) etc. However, if the clock frequencies deviate from the desired frequencies, then positive or negative stuffing is required. During positive stuffing, a dummy bit is inserted into the pulse frame (or the pulse superframe) of the outgoing digital signal DSa, instead of an information bit, that is to say a read pulse is suppressed, as a result of which the read address AR initially remains constant. This is shown by the dotted line in FIG. 7. On the other hand, during negative stuffing, an additional information bit is read out of the memory 2 and is inserted into the pulse frame in the time slot B of the outgoing digital system. This is shown by the dashed line in FIG. 7.

Initially, a stuffing process is initiated whenever the difference between the write address AW and the read address AR exceeds the upper difference value DWo or is less than the lower difference value DWu. As already mentioned, it is now intended to determine even smaller phase differences between the outgoing digital signal and the incoming digital signal and the desired positions of the write clock and the read clock in order to be able to initiate stuffing processes additionally in pairs. One possibility for determining the phase deviation is to measure the phase difference between the write clock and read clock directly, it being necessary to take into account the desired positions in the case of a read clock which has gaps.

An advantageous development of this method uses a plurality of testing times PP1 to PP4 corresponding to the number of pulse frames R in a stuffing superframe SUR, instead of a single decision time EST.

From FIG. 5 it can be seen that the period duration of the gapped read clock TR is shorter than that of the common write clock TW. This results in the response, shown in FIG. 8, of the read clock, of the write clock and of the difference value DW—that is the difference between the bits which are read in and those which are read out, and the occupancy level of the memory. If the write clock, which is likewise shown, and the read clock correspond in terms of their desired frequencies, and the data rates of the outgoing digital signal (without stuffing) and of the incoming digital signal correspond, the timing diagram which is shown in FIG. 8 is likewise repeated periodically using each pulse frame.

This representation corresponds to the phase deviation PA=0, in the case of which the phase of the outgoing digital signal corresponds exactly to its "desired value" (description of FIG. 1). If the evaluation of the difference values takes place at one of the testing times PP1 to PP4, which replace the conventional stuffing decision time STE, then neither the upper difference value DWo=16 nor the lower difference value DWu=14 is reached.

Instead of an "amplitude threshold value" ESo, ESu for the phase deviation, the process is now based on the following: the phase difference PN1 (FIG. 8) between the effective edges of the read clock TR and of the write clock TW and the first testing time PP1 corresponds, in the case of the desired position, to the difference in the period duration of the write clock TW and of the read clock TR. The phase difference PN1 is evaluated when the phase of the write clock TW is shifted forwards in comparison with that of the read clock TR. Double the phase difference PN2 results for the subsequent testing time PP2. A multiple of this phase difference PN1 can thus be determined by suitable selection of the testing time. In the event of phase shifts in the opposite direction, the phase differences between the effective edge of the read clock and the preceding effective edge of the write clock apply. Only the phase difference PP1 of this is shown in FIG. 8.

Figure 8:
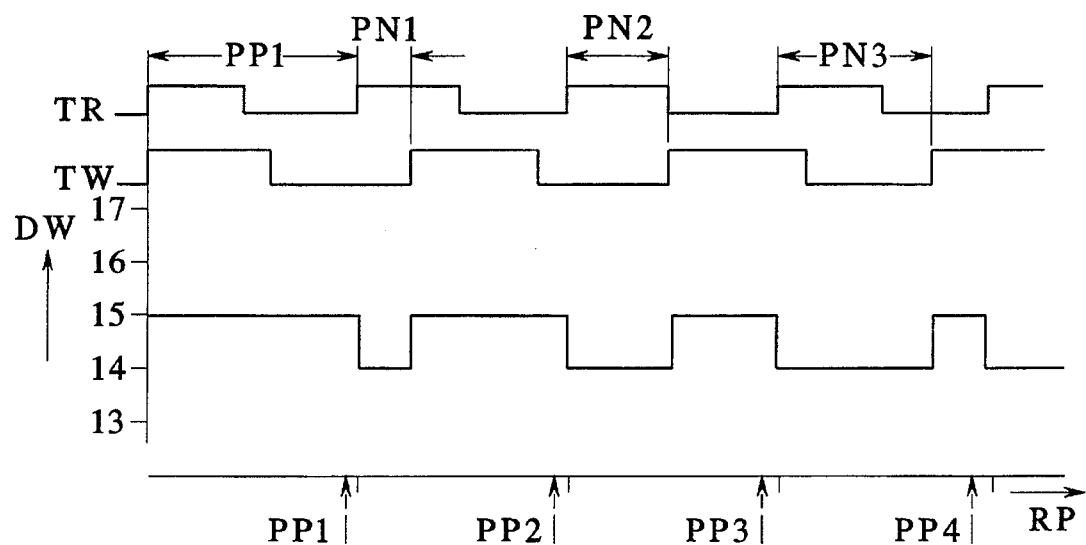
FIG. 8 shows a timing diagram for determining the phase difference.

When the write and read clocks deviate from their desired frequencies, the phase differences PN and PP deviate from their "desired phase differences" which are shown in FIG. 8, corresponding to the phase difference PA.

A deviation which leads to shifts in the clocks, which shifts are greater than the phase differences shown in FIG. 8, is evaluated in a corresponding manner to a decision threshold being exceeded, and causes a stuffing process. The phase difference PN1 corresponds to the step height of the decision characteristics shown. The phase difference, and hence the phase difference, are determined via the occupancy level of the memory.

Figure 9:
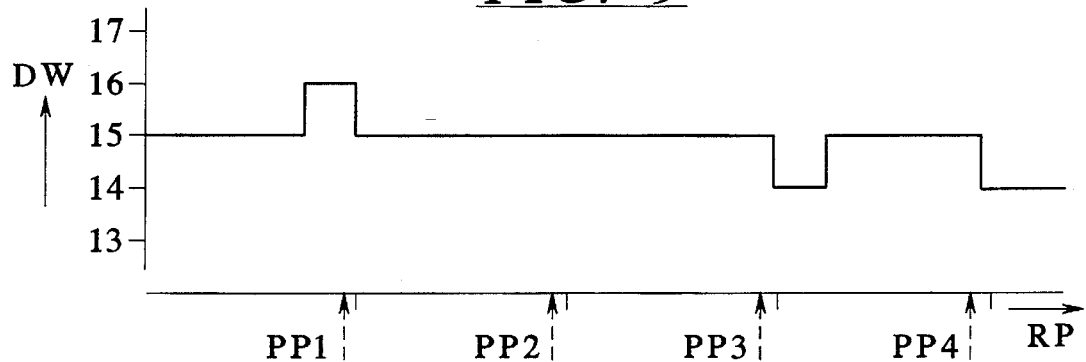
FIGS. 9, 10 show further timing diagrams for this purpose.

In contrast to the examples shown in FIG. 1 to FIG. 4, in FIG. 9 it has now been assumed that the phase of the write clock is moving forwards in time (to the left of the drawing) relative to the read clock. The write clock thus has a higher frequency than the read clock (or the desired value).

Figure 10:
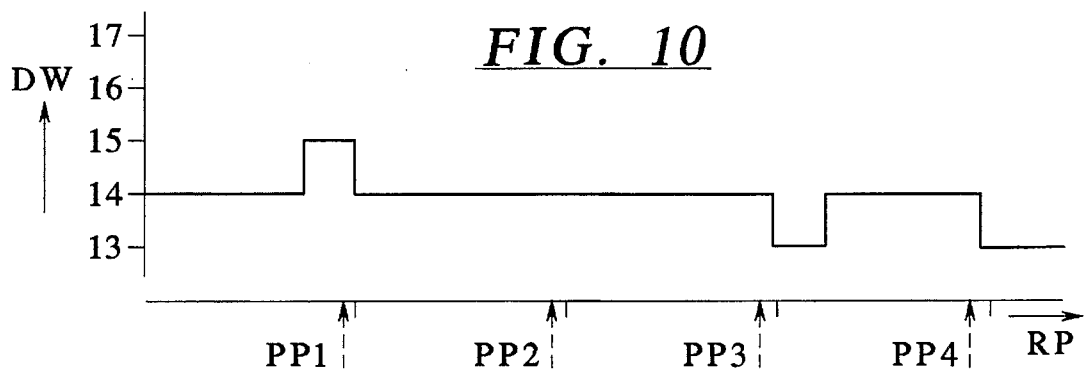

As a consequence of the phase shift, a change in the sequence between the change in the read address and the write address at the time of the testing time PP1 takes place between the clocks, that is to say the write clock has "overtaken" the read clock. At the testing time PP1, the difference value reaches the upper difference value DWo=16 and thus initiates a stuffing process. Since the upper difference value (the incoming digital signal has a higher data rate than the outgoing digital signal) has been reached here, it is negatively stuffed. In consequence, the difference value is reduced by 1 at the end of the pulse frame. FIG. 10 applies to the subsequent pulse frame. The stuffing decision now takes place one pulse frame R and additionally one period of the read clock later at the next testing time PP2. There, the difference value DW=14, the lower difference value DWu= 14 is reached, and it is positively stuffed. The testing time is changed from pulse frame to pulse frame corresponding to the number of pulse frame periods in a stuffing superframe until the process starts again with the first testing time PP, of the testing time which follow directly thereon. Further timing diagrams for the subsequent stuffing processes are dispensed with here.

Thus, the difference between the write clock and the read clock is no longer measured at a specific testing time in the case of this process, the determination of whether the sequence of changing the write address and the read address has shifted being carried out at different testing times, instead. An evaluation of the difference value at the testing times is sufficient for this purpose.

Occasionally a change in the difference value Dw occurs, which initiates a stuffing process. The testing times can be defined within the pulse frame corresponding to the desired differences between the decision thresholds. In the present example, four periods of the write clock correspond to five periods of the read clock. The change between the write address and read address at the testing time PP1 corresponds to the phase shift by a quarter of one period of the read clock and a fifth of one period of the write clock within a pulse frame.

FIG. 11 shows the system controller 8 in detail. It contains a frame generator 9 which defines the pulse frame via its frame counter. The frame counter controls a frame number counter 10 which defines the number of pulse frames per stuffing superframe and additionally determines the decision thresholds corresponding to the present frame R of a stuffing superframe in order to initiate stuffing processes—that is to say the decision characteristic. The outputs of the frame generator 9 and of the frame number counter 10 are connected to a control logic circuit 11 to which control signals SNS and SPS are supplied from the threshold value decision device 7. Specific time conditions are determined and, in addition, the control signals having time conditions are linked to one another by means of a combinational logic circuit, in the control logic circuit. A control signal STP to determine the testing times PP1 to PP4 is output, in that a clock pulse is emitted at the corresponding time in each pulse frame. In addition, a further read control signal SR is produced which, via a logic gate 12, produces the gapped read clock TR from a read clock signal TRS and—controlled by the stuffing signals SNS and SPS—inserts or extracts individual pulses of the read clock during stuffing processes. Although other modifications and changes may be suggested by those skilled in the art, it is the intention of the inventor to embody within the patent warranted hereon all changes and modifications as reasonably and properly come within the scope of his contribution to the art.

I claim:

1. An arrangement for transmitting at least one incoming digital signal via a data channel having a constant clock rate, whereby data rates of a matching step are matched by positive-zero-negative stuffing in that, on reaching a predetermined upper or lower phase separation, additional stuffing processes are produced, comprising:

a memory into which an incoming digital signal is written using a write clock and from which reading out takes place using a read clock, a system controller connected to said memory for controlling an outgoing digital signal and the stuffing processes, and a threshold value decision device which initiates a stuffing process in the event of an upper stepped decision threshold being exceeded or a lower decision threshold being undershot, said threshold value decision device having an upper decision threshold for a phase separation of less than one unit interval and ≧0, which runs in a stepped manner and changes with each of N pulse frames of a stuffing superframe, and having a lower decision threshold, which proceeds uniformly therewith, means for determining phase deviations of less than one unit interval which initiate a stuffing process when a decision threshold is upwardly or downwardly transgressed, said system controller including:

a frame generator which forms the pulse frame; a frame number counter connected to an output of said frame generator to count the pulse frames; and, a control logic circuit connected to receive control logic circuit time criteria from the frame generator and from the frame number counter, and the control logic circuit produces a control signal which corresponds to a pulse, which is allocated to each and every pulse frame of a stuffing superframe, at different testing times, which pulse stores a difference value which indicates the occupancy level of the memory.

2. A method for transmitting at least one incoming digital signal in a data channel having a constant clock rate, comprising the steps of:

storing the incoming digital signal in a buffer memory;

matching a data rate of the incoming digital signal to the constant clock rate of the data channel by positive-zero-negative stuffing wherein a stuffing process is initiated if a phase difference between the incoming digital signal and an outgoing digital signal from said storing step reaches a decision threshold level, said decision threshold being one of an upper decision threshold and a lower decision threshold;

having a stuffing superframe which is defined between two possible stuffing processes in a same direction between successive of said positive and negative stuffing processes, having a constant number of pulse frames;

using for additional stuffing processes beyond required stuffing processes, wherein said required stuffing processes are implemented when the phase difference exceeds one unit interval, further comprises the steps of:

the upper decision threshold which runs in a stepped manner from a maximum value which is not more than one unit interval to a minimum value of not less than zero for initiating the stuffing process and the lower decision threshold which runs in a same manner from a maximum value which is less than the minimum value of the upper decision threshold at a spacing of one unit interval for initiating an opposite other stuffing process;

reducing the decision thresholds during each period duration of the stuffing superframe step-by-step with each frame from the maximum values to the minimum values corresponding to said upper and lower decision thresholds and then setting the decision thresholds to the maximum values again at a beginning of a next superframe;

carrying out the additional stuffing processes in pairs by using smaller decision thresholds of said reducing step such that an additional positive stuffing process is followed by a negative stuffing process or such that an additional negative stuffing process is followed by a positive stuffing process;

varying time intervals during said carrying out step between said positive stuffing process and said negative stuffing process and between said negative stuffing process and a subsequent positive stuffing process as a function of the phase difference and the decision thresholds and as a result of the additional stuffing processes a mean value of the phase difference between the outgoing digital signal and the incoming digital signal is approximately constant and reaches approximately a rated value of zero;

evaluating difference values which indicate an occupancy level of a buffer memory as said decision thresholds for initiating the additional stuffing processes at different test moments, each test moment being allocated to one of the pulse frames of a stuffing superframe and one period of the pulse frames and an additional small time difference from a last test moment apart transmitting the outgoing digital signal having a rate adjusted by stuffing.

3. A method as claimed in claim 2, further comprising the steps of:

combining, at a transmission end, a plurality of outgoing digital signals including said stuffing signals corresponding to said positive, zero, or negative stuffing signals to form a multiplex signal, and splitting, at a receiving end, the multiplex signal into individual signals which are read out using a read clock at the receiving end, which is obtained in a phase-locked loop.

4. A method as claimed in claim 2, further comprising the step of:

selecting the stuffing superframe and the decision thresholds in such a manner that the phase difference between the outgoing digital signal and the incoming digital signal changes during the stuffing superframe less the difference between two adjacent decision threshold values.

* * * * *